(12) United States Patent
Kordlou

(10) Patent No.: US 12,535,048 B1
(45) Date of Patent: Jan. 27, 2026

(54) KORDLOU GREEN ENERGY SYSTEM—MODULAR GRAVITY-DRIVEN HYDROKINETIC ENERGY SYSTEM WITH SELF-REGULATING DISCHARGE, INLINE TURBINE MODULE, AND SEABED-INDEPENDENT DEPLOYMENT ARCHITECTURE

(71) Applicant: Hossein Kordlou, Woodland Hills, CA (US)

(72) Inventor: Hossein Kordlou, Woodland Hills, CA (US)

( * ) Notice: Subject to any disclaimer, the term of this patent is extended or adjusted under 35 U.S.C. 154(b) by 0 days.

(21) Appl. No.: 19/234,146

(22) Filed: Jun. 10, 2025

(51) Int. Cl.
| | |
|---|---|
| F03B 17/06 | (2006.01) |
| F03B 11/00 | (2006.01) |
| F03B 11/08 | (2006.01) |
| F03B 13/10 | (2006.01) |
| F03B 13/12 | (2006.01) |
| F03B 13/14 | (2006.01) |
| F03B 13/22 | (2006.01) |
| F03B 13/26 | (2006.01) |

(52) U.S. Cl.
CPC .......... *F03B 17/061* (2013.01); *F03B 11/004* (2013.01); *F03B 11/08* (2013.01); *F03B 13/10* (2013.01); *F03B 13/12* (2013.01); *F03B 13/14* (2013.01); *F03B 13/22* (2013.01); *F03B 13/26* (2013.01); *F05B 2220/32* (2013.01)

(58) Field of Classification Search
CPC ........ F03B 11/004; F03B 11/08; F03B 13/10; F03B 13/12; F03B 13/14; F03B 13/22; F03B 13/26; F03B 17/061; F05B 2220/32
See application file for complete search history.

(56) References Cited

U.S. PATENT DOCUMENTS

| | | | | | |
|---|---|---|---|---|---|
| 4,447,740 | A | * | 5/1984 | Heck | F03D 9/008 416/85 |
| 6,114,773 | A | * | 9/2000 | Kouris | F03B 13/08 60/398 |
| 6,291,904 | B1 | * | 9/2001 | Carroll | F03B 13/187 290/43 |
| 6,454,546 | B1 | * | 9/2002 | Huang | F03B 17/063 60/398 |
| 2009/0211241 | A1 | * | 8/2009 | Moffat | F03B 13/22 60/501 |
| 2012/0124986 | A1 | * | 5/2012 | Carter | F03B 13/22 60/398 |

\* cited by examiner

*Primary Examiner* — Audrey B. Walter

(57) ABSTRACT

A modular, gravity-driven hydrokinetic energy system for submerged deployment. The system comprises a conical intake funnel, vertically aligned conduit, an inline axial-flow turbine-generator module, and a siphon-based discharge subsystem regulated by a venturi module and one-way valve. Operating independently of ambient currents, it relies on gravitational potential and hydrostatic pressure. Structural modularity allows for scaling and transport. Anchored by tensioned mooring cables and optional buoyancy modules, the system enables seabed-independent deployment. A venturi-enhanced discharge minimizes head loss, enabling continuous flow. Intake screens and vortex suppressors mitigate marine life entrainment. The design supports robust power generation in various oceanic locations and can be disassembled without fixed foundations, ensuring environmental compatibility and mechanical robustness.

32 Claims, 10 Drawing Sheets

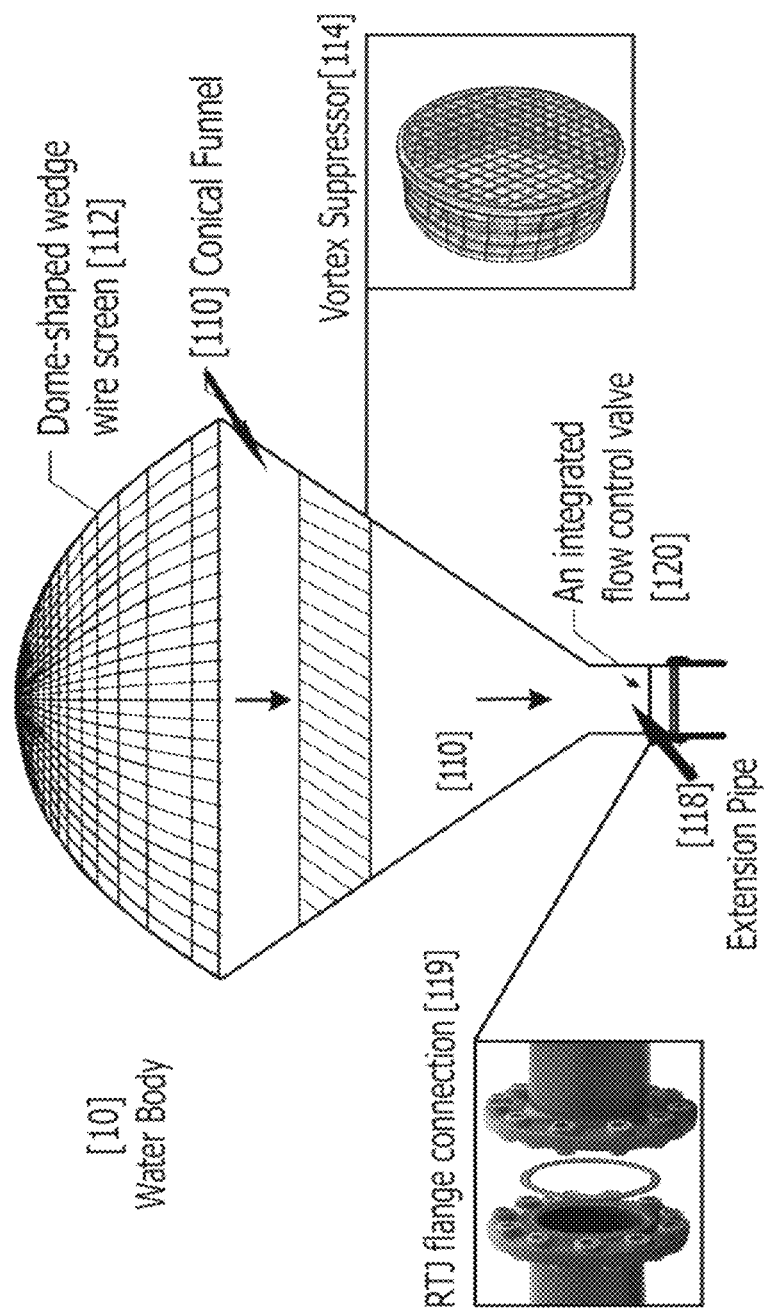
FIG. 2: Intake Funnel Assembly with Marine Screen and Valve

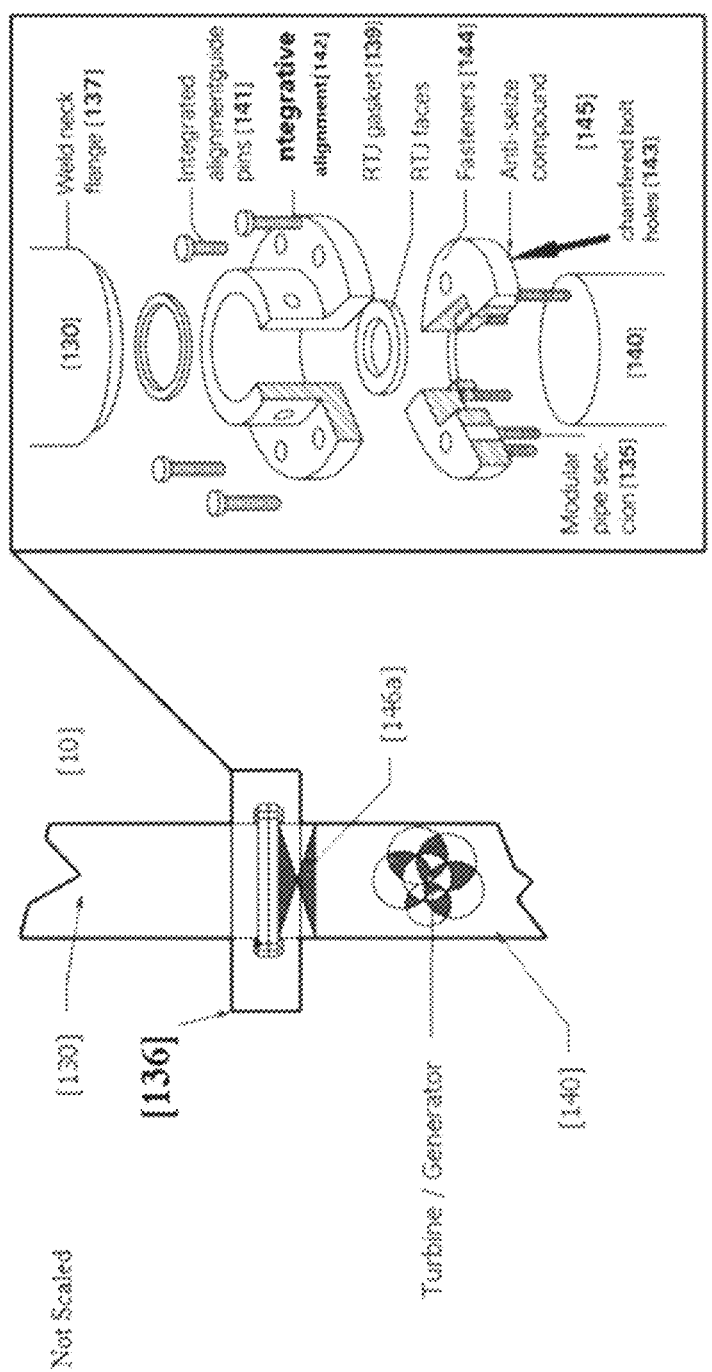
FIG. 3: Modular Joint Assembly in Vertical Conduit

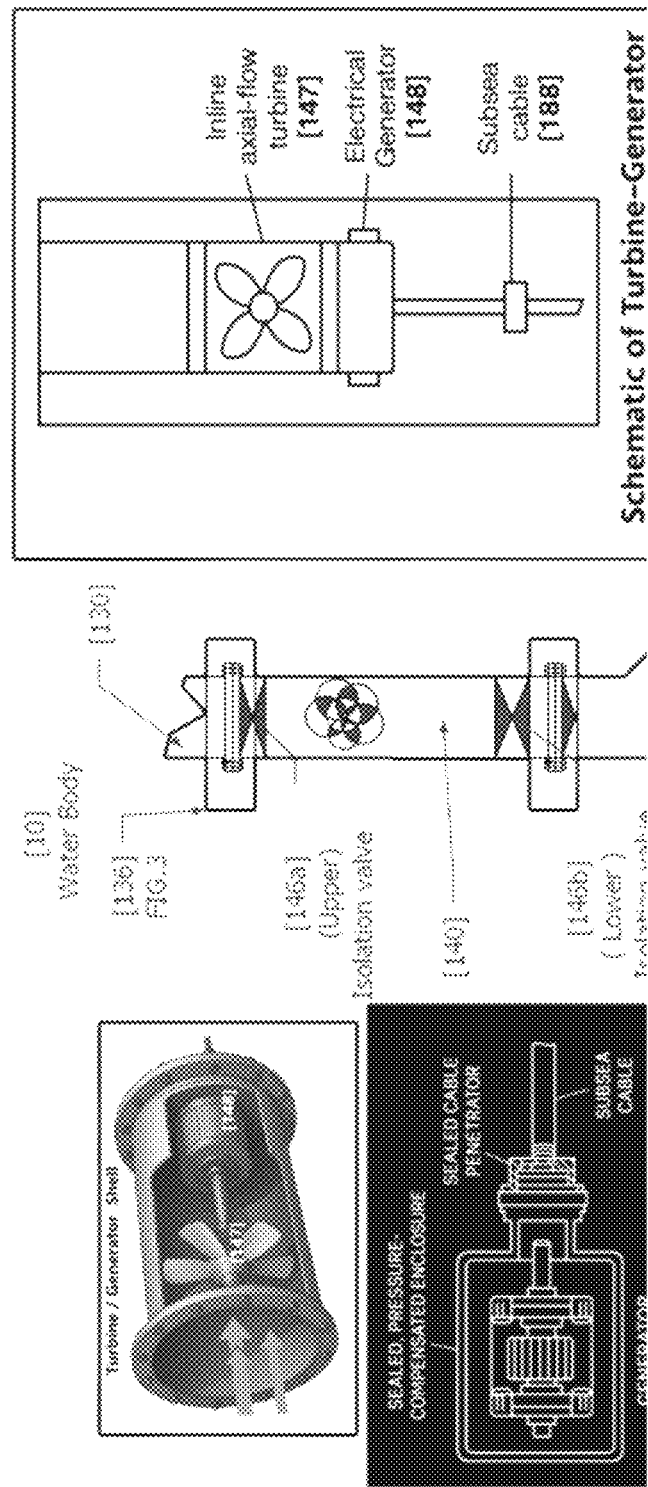
FIG. 4: Turbine Module with Axial-Flow Turbine and Generator.

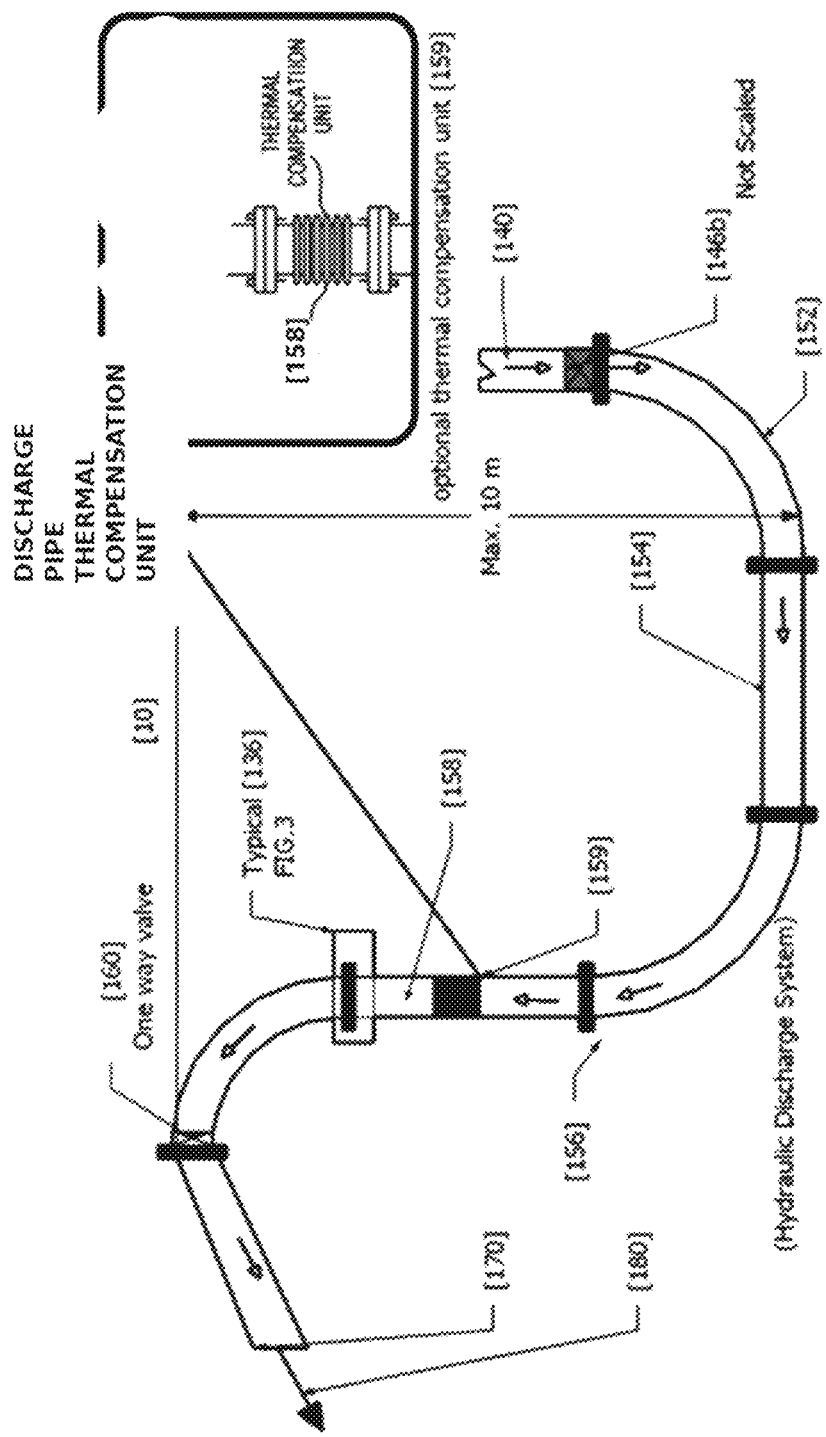
FIG. 5: Hydraulic Discharge System with Vertical Riser and One-Way Valve.

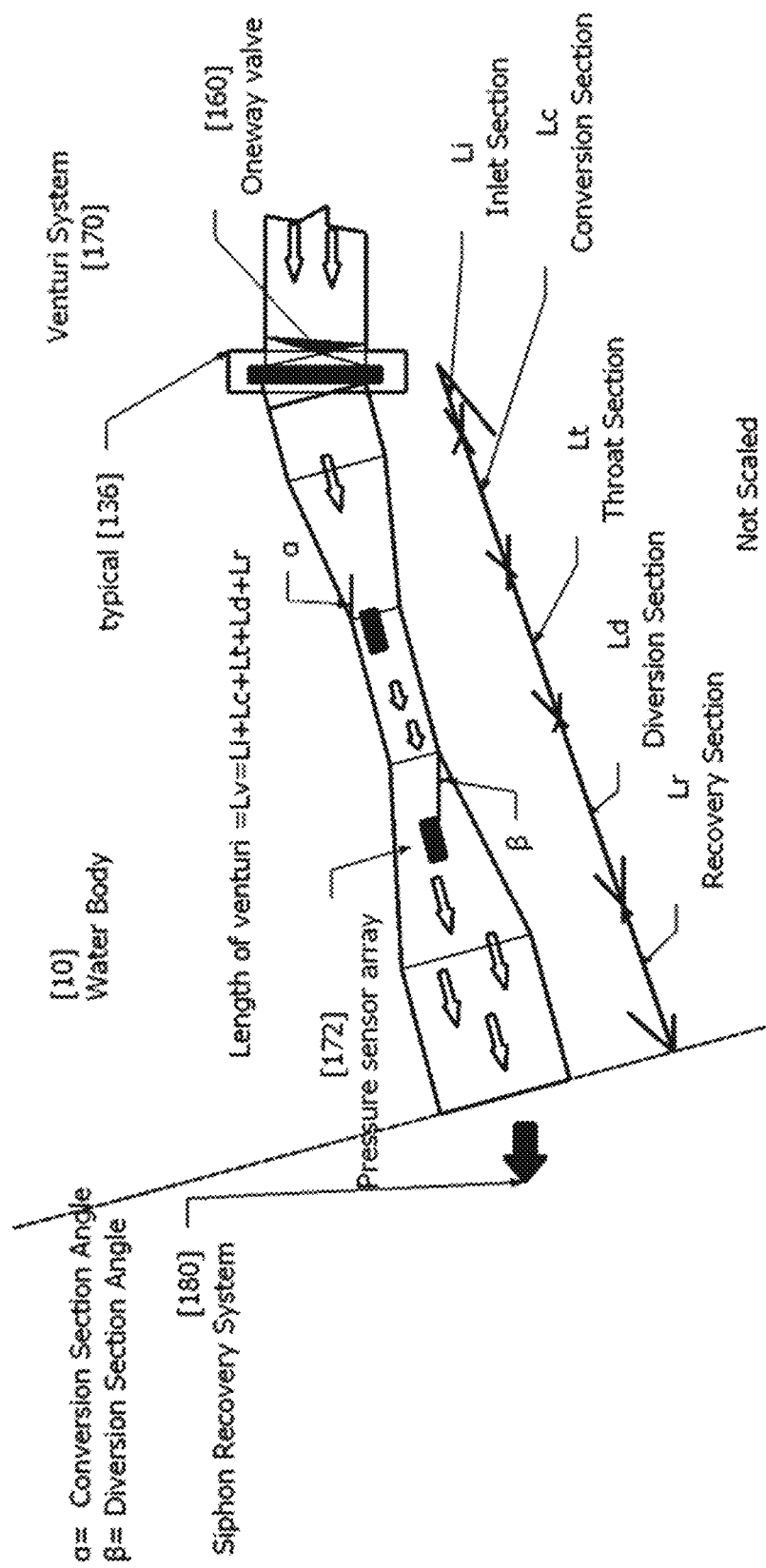
FIG. 6: Venturi Discharge System with Pressure Sensor Array

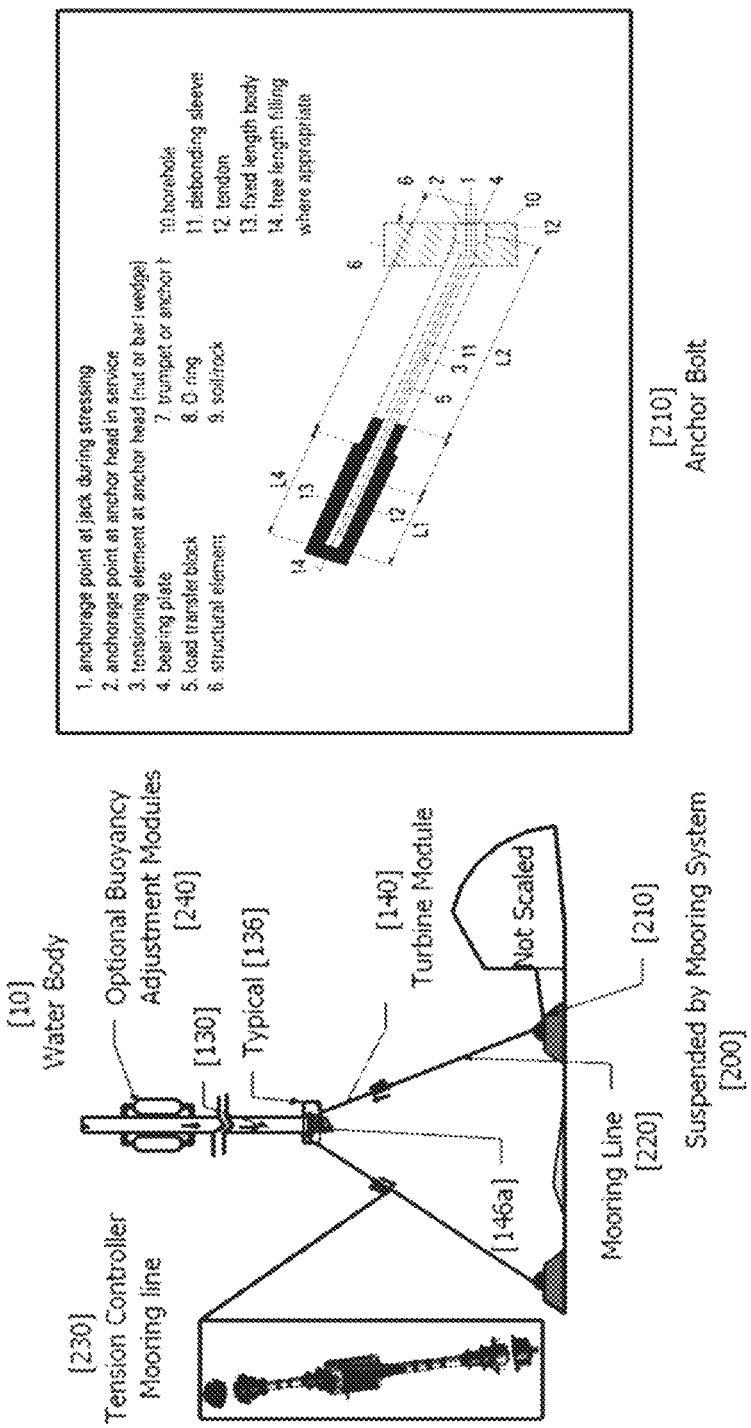
FIG. 7: Mooring and Buoyancy Control System.

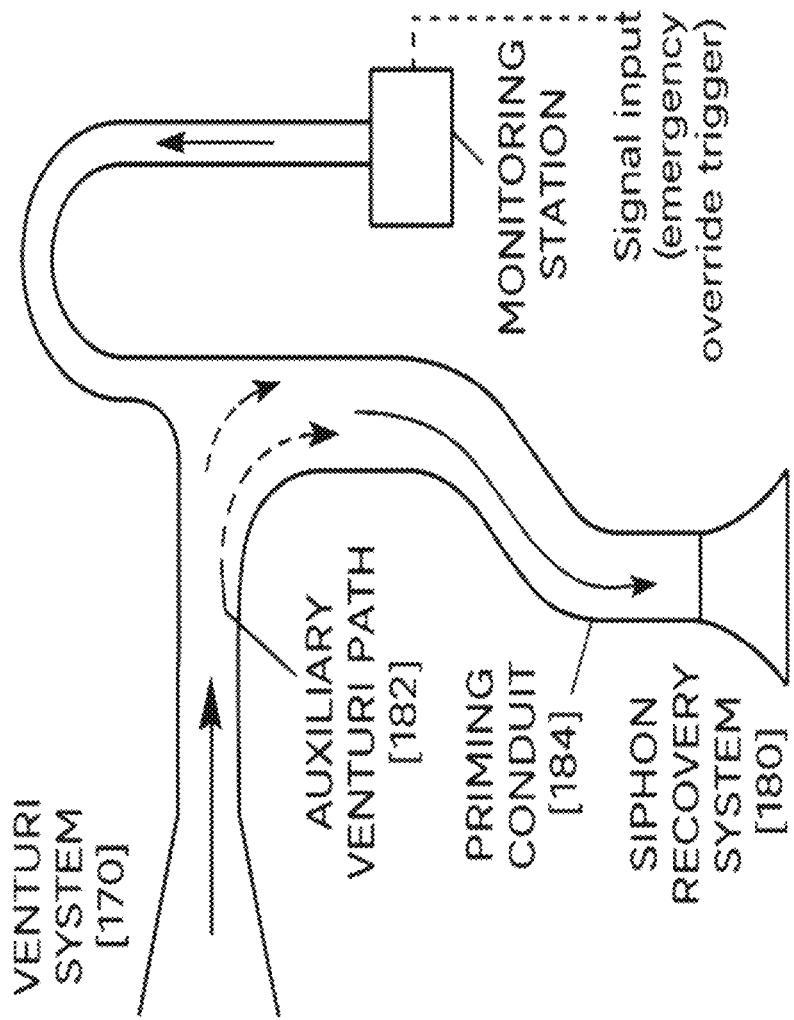
FIG. 8: Siphon Recovery System with Auxiliary Venturi and Priming Path.

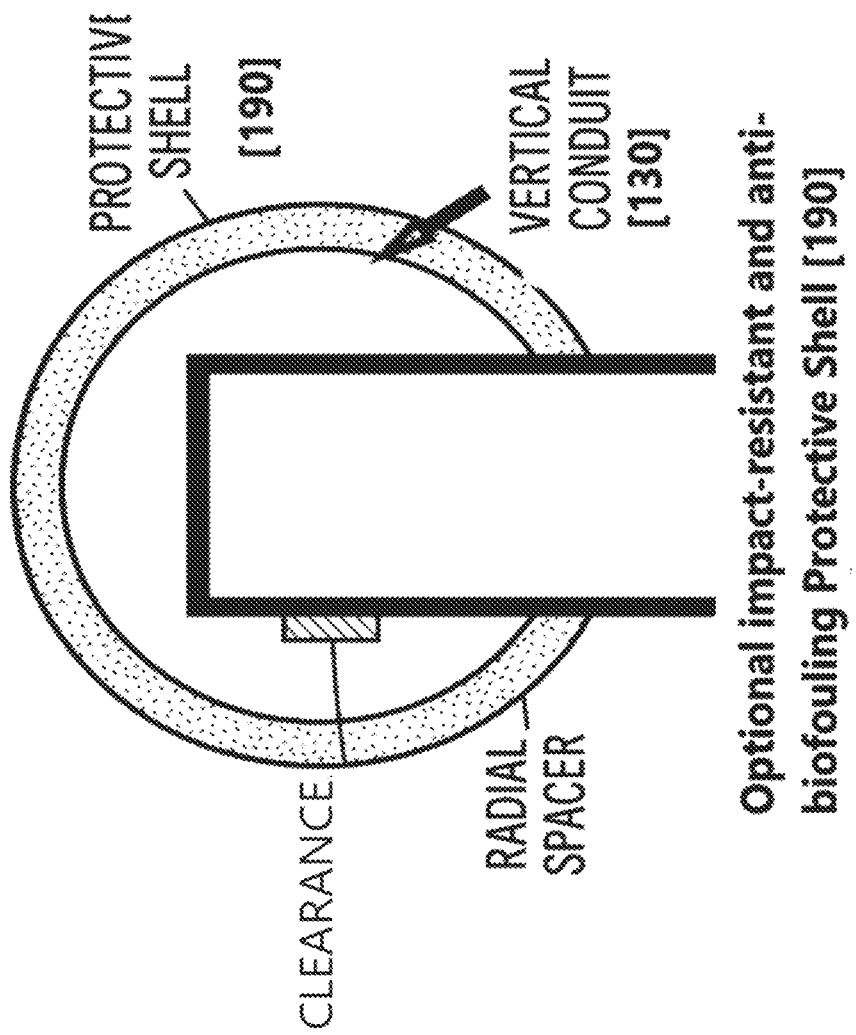
FIG. 9: Protective Shell for Structural Components (Anti-Biofouling/Impact).

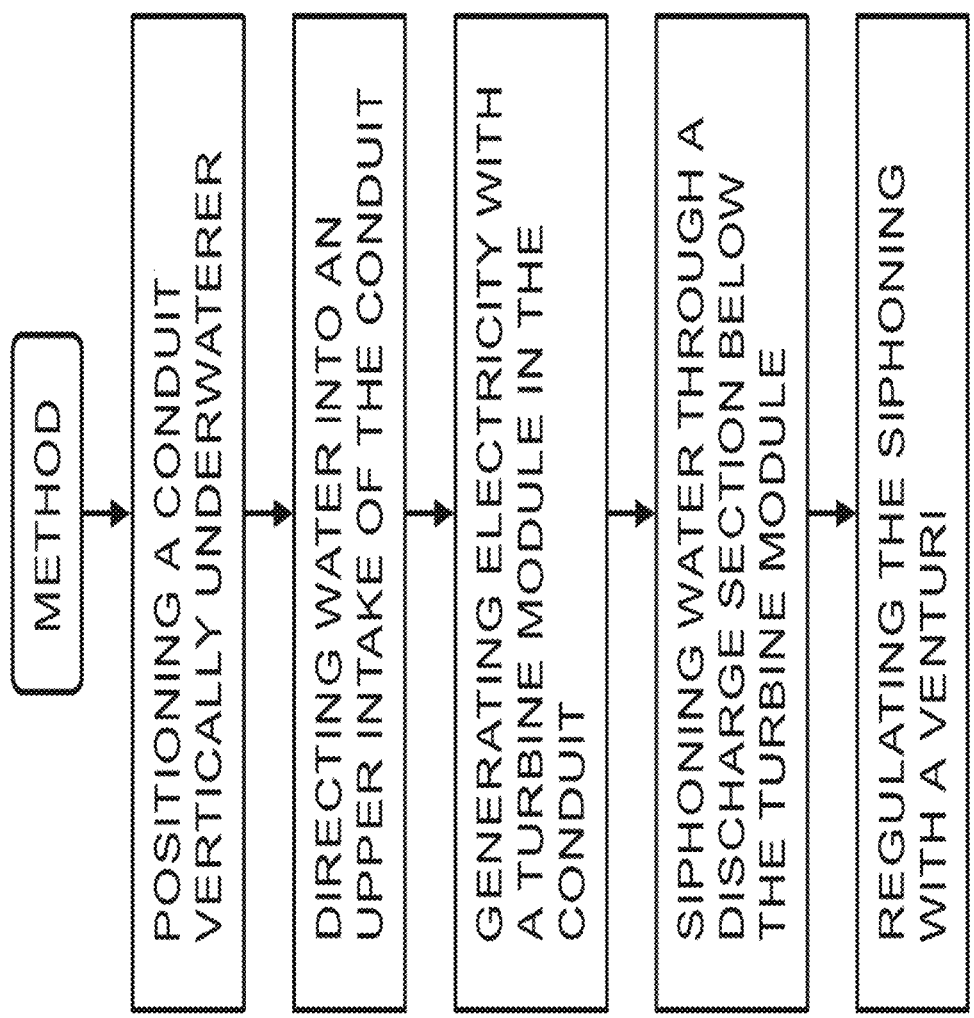
FIG. 10: Flowchart for Gravity-Fed Energy Generation Method.

KORDLOU GREEN ENERGY SYSTEM—MODULAR GRAVITY-DRIVEN HYDROKINETIC ENERGY SYSTEM WITH SELF-REGULATING DISCHARGE, INLINE TURBINE MODULE, AND SEABED-INDEPENDENT DEPLOYMENT ARCHITECTURE

CROSS-REFERENCE TO RELATED APPLICATIONS

Not applicable no provisional or related applications filed.

STATEMENT REGARDING FEDERALLY SPONSORED RESEARCH

Not applicable no federal sponsorship received.

A modular, gravity-driven hydrokinetic energy system for submerged deployment. The system comprises a conical intake funnel, vertically aligned conduit, an inline axial-flow turbine-generator module, and a siphon-based discharge subsystem regulated by a venturi module and one-way valve. Operating independently of ambient currents, it relies on gravitational potential and hydrostatic pressure. Structural modularity allows for scaling and transport. Anchored by tensioned mooring cables and optional buoyancy modules, the system enables seabed-independent deployment. A venturi-enhanced discharge minimizes head loss, enabling continuous flow. Intake screens and vortex suppressors mitigate marine life entrainment. The design supports robust power generation in various oceanic locations and can be disassembled without fixed foundations, ensuring environmental compatibility and mechanical robustness.

FIELD OF THE INVENTION

The present invention relates generally to the field of marine renewable energy. More specifically, it pertains to a modular, gravity-driven hydrokinetic energy system configured for submerged deployment in oceanic environments. The system operates independently of surface infrastructure and ambient ocean currents, harnessing gravitational potential energy from ocean water to drive electricity generation via an inline turbine module.

BACKGROUND OF THE INVENTION

Existing marine energy systems, such as tidal turbines or floating wind platforms, are limited by environmental variability, surface exposure, or infrastructure complexity. Many systems are constrained by their dependence on surface floats, wave motion, or tidal currents. Additionally, biofouling, turbulent inflow, and mechanical inaccessibility limit the longevity and serviceability of traditional designs.

What is needed is a modular, scalable, and fully submersible hydrokinetic power station capable of long-term deployment in a variety of ocean depths, without the need for rigid seabed foundations or reliance on horizontal current velocities. The invention herein fulfills these requirements through a vertically oriented, gravity-fed flow system with integrated discharge management, subsurface-only deployment, and isolation-enabled turbine modules ensuring long-term serviceability.

Unlike prior submerged turbine systems that rely solely on ambient current or external pumping, the present invention integrates a gravity-driven siphon flow with a venturi-regulated discharge to enable continuous, self-regulating operation independent of ocean flow variability.

The combined use of modular vertical conduit segments, inline turbine placement, and an autonomous siphon recovery mechanism provides a non-obvious solution to deep-water deployment challenges, energy reliability, and maintenance efficiency not addressed in the prior art.

BRIEF SUMMARY OF THE INVENTION

The invention comprises a vertically aligned conduit system positioned entirely beneath the ocean surface, configured to intake water via a submerged funnel, channel it downward through an inline turbine-generator module, and discharge it upward through a siphon-assisted and venturi-regulated pathway.

The system includes modular pipe segments, isolation valves, mooring cables, optional buoyancy controls, siphon restart mechanisms, and protective housings, all designed for robust, subsurface-only operation independent of any surface platform.

Terminology and Interpretation

As used throughout this disclosure:

The term "module" refers to any functional or structural unit that may be integrated, attached, or removed from the system. A module may comprise a single component or multiple sub-components, may be rigid or flexible, and may perform mechanical, hydraulic, electrical, structural, or control-related functions.

The term "fluid" encompasses any substance capable of flow, including but not limited to water, seawater, brine, or other natural or engineered liquids. The fluid may be clean or contain suspended particulates, organisms, or entrained air.

The term "anchor" or "anchoring system" refers to any structure or mechanism that stabilizes, restrains, or positions the system, and may include seabed-mounted foundations, tensioned cables, suction piles, ballast systems, floating moorings, or combinations thereof. The anchor may be dynamic or repositionable in nature.

The term "conduit" refers broadly to any passage, tube, duct, or pipeline used to transport fluid. The conduit may be rigid or flexible, segmented or continuous, and constructed from any suitable marine-grade or composite material.

The term "generator" may include any energy conversion device capable of producing electrical power, including direct-drive generators, gear-coupled turbines, or magneto-hydrodynamic devices.

The term "intake" or "funnel" includes any structure designed to guide fluid into the conduit system, including conical, bell-mouth, or screen-protected designs, with or without flow-directing vanes or vortex suppressors.

The term "valve" includes mechanical, hydraulic, or passive devices for controlling flow, including one-way valves, stop valves, control gates, or venturi-based restrictions.

BRIEF DESCRIPTION OF THE DRAWINGS

The application includes 10 figures, numbered FIG. 1 through FIG. 10. Figures are submitted in a separate pdf in accordance with USPTO requirements.

FIG. 2: Intake Funnel Assembly with Marine Screen and Valve.

FIG. 3: Modular Joint Assembly in Vertical Conduit.

FIG. 4: Turbine Module with Axial-Flow Turbine and Generator.

FIG. 5: Hydraulic Discharge System with Vertical Riser and One-Way Valve.

FIG. 6: Venturi Discharge System with Pressure Sensor Array.

FIG. 7: Mooring and Buoyancy Control System.

FIG. 8: Siphon Recovery System with Auxiliary Venturi and Priming Path.

FIG. 9: Protective Shell for Structural Components (Anti-Biofouling/Impact).

FIG. 10: Flowchart for Gravity-Fed Energy Generation Method.

DETAILED DESCRIPTION OF THE INVENTION

Figure 1:
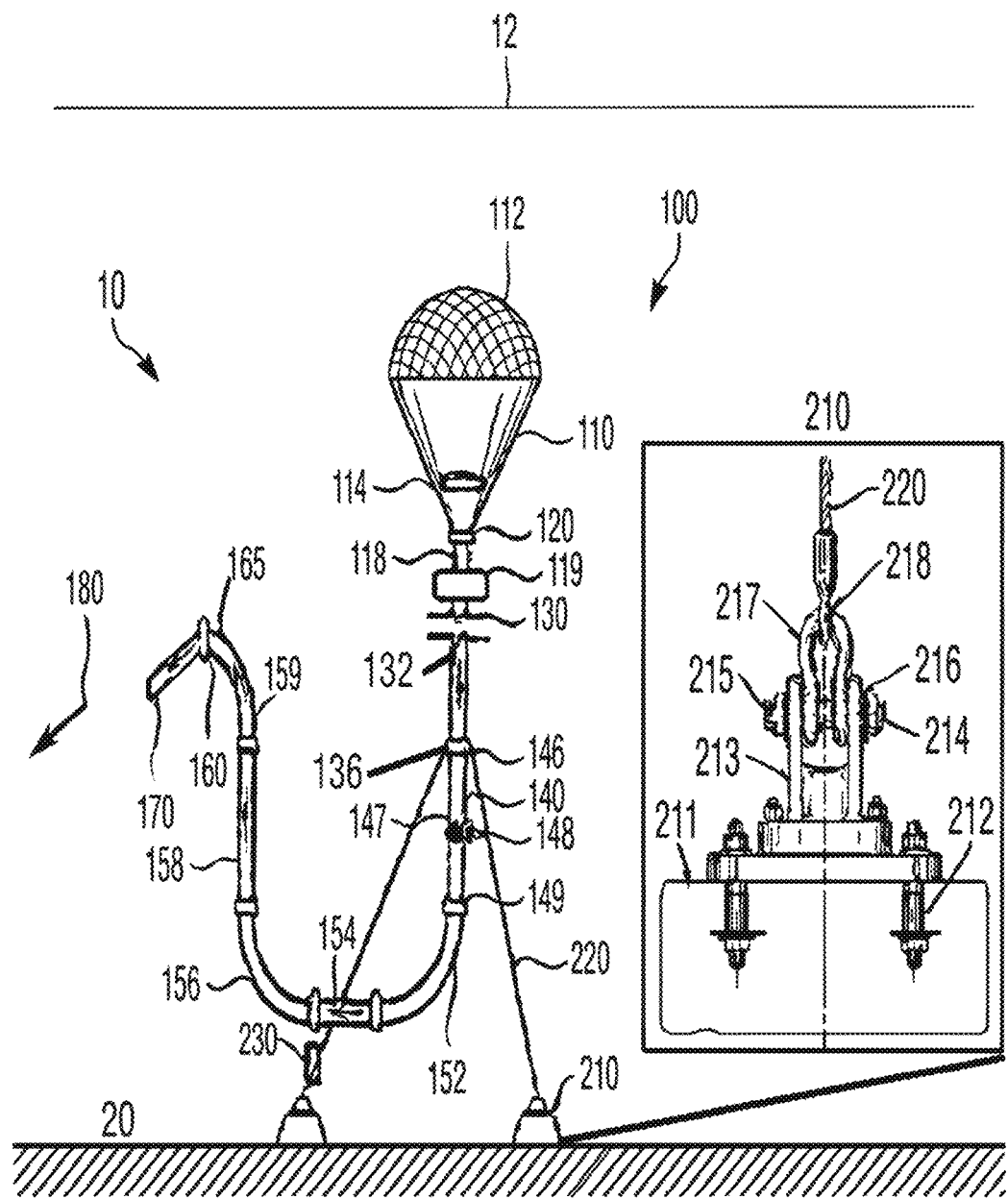
FIG. 1: System Overview: Kordlou Green Energy Assembly.

The Kordlou Green Energy system [100] comprises an interconnected network of intake, power generation, discharge, mooring, and monitoring subsystems. These are assembled into a vertically aligned module and submerged at depth, tethered by mooring lines to the seabed and optionally supported by neutral or positive buoyancy modules. The present invention provides a novel and highly advantageous hydrokinetic power generation system.

This system is uniquely architected to operate with complete independence from ambient water currents and does not necessitate seabed anchoring for its operational deployment. The invention fundamentally comprises a vertically oriented, modular conduit system [130] precisely suspended within a water column [10].

It is meticulously designed to generate continuous electrical power by harnessing the gravitational potential energy of a controlled internal water flow, driving an inline turbine [147], and employing a self-regulating discharge configuration to optimize hydraulic efficiency.

FIG. 1 illustrates the Kordlou Green Energy System [100] in its fully deployed configuration, showing the synergistic arrangement of its key structural and functional components. The system is depicted submerged within a body of water [10], anchored to the seabed [210] via a mooring system [200], and operating independently of surface structures. Water ingress occurs at the intake funnel [110], strategically positioned at a suggested minimum depth (e.g., 28 times the conduit diameter, 28D) below the water surface to harness hydrostatic head and minimize surface-related disturbances. Optional buoyancy modules [240] are shown near the intake, contributing to depth control and stability. The gravitational flow proceeds downwards through the vertical conduit [130], passing through the axial turbine/generator module [140] where energy conversion occurs. The flow then enters the hydraulic discharge system [150], characterized by elbows ([152], [156]), a horizontal segment [154], and a vertical riser [158]. An integrated thermal compensation unit [159] is shown on the riser [158]. A one-way valve [160] is positioned at the apex of the discharge loop, leading to the venturi system [170], which optimizes discharge pressure and flow characteristics. Final discharge occurs via the Siphon Recovery System [180]. The entire assembly is stabilized by the mooring system [200], comprising seabed anchors [210], tensioned mooring lines [220], and distinct Tension Controllers [230] integrated into the mooring lines. This holistic view underscores the system's integrated design for autonomous, subsurface power generation. The "NOT SCALED" notation indicates the schematic nature of the drawing.

Referring to FIG. 2, the intake assembly is the initial point of water ingress for the Kordlou Green Energy System [100], designed for optimal hydraulic performance and protection against marine bio-ingress. It is strategically positioned at a substantial subsurface depth, specified as no less than twenty-eight times the nominal internal diameter (D) of the vertical conduit [130], thereby optimizing hydrostatic head while minimizing surface-induced turbulence. The primary component is the conical intake funnel [110], oriented to capture ambient water from the body of water [10]. Its uppermost aperture is proportioned at approximately twelve times the diameter (12D) and has a vertical height of approximately six times D to ensure high volumetric intake while maintaining manageable entrance velocity. This aperture is protectively covered by a dome-shaped marine life-exclusion screen [112], preferably constructed from robust wedge wire to prevent biological ingress (e.g., fish, debris) and debris accumulation while minimizing flow restriction, promoting laminar flow, and offering ecological protection and anti-fouling characteristics. Positioned within the funnel [110] is an optional Vortex Suppressor [114]. FIG. 2 provides an inset showing an exemplary detailed view of the Vortex Suppressor [114] as a robust cylindrical mesh or screen structure. This component [114] functions to mitigate rotational swirl in the incoming water, thereby stabilizing the axial flow and increasing downstream hydraulic efficiency. At the narrowed throat of the funnel [110], a full-bore isolation valve [120] is mounted. This valve [120] provides essential control functionality for system start-up, shutdown, and maintenance isolation. The valve [120] is mechanically joined to the downstream extension pipe [118] via a precision-engineered Ring-Type Joint (RTJ) flange connection [119].

Referring to FIG. 3, the modular joint architecture employed in the construction of the vertical conduit [130] is depicted. The vertical conduit [130] forms the primary gravitational flow path and is constructed from a plurality of modular pipe segments [132], each typically having a length of approximately eight times D. This design facilitates scalable installation and in-situ serviceability. The figure shows a Bolted Flange Assembly [136] that forms a joint. An exploded perspective view details the components: Each modular pipe section terminates in a permanently affixed Weld Neck Flange (WNF) [137]. The mating surfaces of these flanges are precision-machined to form Ring Type Joint (RTJ) faces [138], designed to accommodate a metallic RTJ gasket [139]. This configuration ensures a robust, metal-to-metal, pressure-rated seal suitable for extreme hydrostatic environments. Assembly alignment is ensured by integrated guide pins [141] on one flange engaging with corresponding alignment sockets [142] on the opposing flange. The flanges are secured by multiple high-strength fasteners [144] passing through circumferentially arranged chamfered bolt holes [143]. Prior to installation, all threaded components are treated with a marine-compatible anti-seize compound [145] to prevent galling and ensure long-term serviceability.

Referring to FIG. 4, the Turbine Module [140] is depicted as the primary energy conversion unit, strategically housed within the vertical conduit [130]. The module [140] is positioned between an upstream isolation valve [146*a*] and a downstream isolation valve [146*b*]. These full-bore isolation valves are crucial for hydraulically isolating the turbine module, enabling in-situ maintenance, inspection, or complete replacement of the turbine [147] or generator [148], significantly reducing operational downtime and costs. The module [140] contains an axial-flow turbine [147], preferably of a Kaplan type, which is mechanically coupled to an electrical generator [148]. The generator [148] is enclosed within a sealed, pressure-compensated housing, typically filled with dielectric fluid to ensure insulation and pressure equalization. The housing includes a "SEALED CABLE PENETRATOR" for the "SUBSEA CABLE" [188], ensuring a high-integrity, watertight exit for the power cable.

FIG. 5 illustrates the Hydraulic Discharge System [150], an engineered conduit pathway designed to manage post-turbine outflow. The system begins downstream of the lower isolation valve [146b]. Water flows through a first smooth, large-radius elbow [152] to a horizontal conduit segment [154], which stabilizes the flow. A second smooth, large-radius elbow [156] redirects the flow vertically upward into the riser segment [158]. The vertical riser segment [158] height is strategically constrained (indicated as "Max. 10 m") to preserve sufficient pressure for the siphon-venturi loop. Integrated within this riser [158] is an optional thermal compensation unit [159] to accommodate dimensional changes. At or near the apex of the riser [158], a one-way check valve [160] is installed to ensure unidirectional flow and prevent back-siphoning.

FIG. 6 provides a detailed schematic of the Venturi System [170]. The venturi receives flow from the upstream one-way valve [160]. The system comprises a series of precisely contoured segments: an optional Inlet Section (Li); a Converging Section (Lc) tapering at angle α; a Throat Section (Lt) of minimum area; a Diverging Section (Ld) expanding at angle β; and an optional Recovery Section (Lr). An embedded pressure sensor array [172] is shown for real-time differential pressure monitoring. The optimized taper angles and segment lengths are selected based on fluid dynamics principles to enhance discharge velocity, promote pressure recovery, and stabilize flow.

FIG. 7 illustrates the Mooring and Buoyancy Control System [200], which enables stable, mid-water deployment independent of fixed seabed foundations. The main structure is shown suspended in the water column. The system comprises one or more Seabed Anchors [210], detailed in an exemplary inset as an "[210] Anchor Bolt." Tensioned Mooring Lines [220], fabricated from high-strength, corrosion-resistant materials, connect these anchors to the main structure. Integrated with these mooring lines are Tension Controllers [230], detailed in an inset, which are dynamic components designed to manage line tension and absorb shock loads. Optional Buoyancy Adjustment Modules [240] are shown affixed near the upper portion of the vertical conduit to support depth adjustment and alignment.

FIG. 8 details the Siphon Recovery System [180], designed to maintain or re-establish continuous hydraulic flow. It is connected downstream of the Venturi System [170]. The configuration includes an Auxiliary Venturi Path [182], which can induce localized low-pressure zones to assist in siphon reactivation. A Priming Conduit [184] is used for introducing a priming fluid volume to displace entrained air and restore liquid continuity. An Emergency Override Interface connects to a Monitoring Station, allowing for remote activation of recovery components.

FIG. 9 provides a detailed cross-sectional view of the optional Protective Shell [190] encasing the Vertical Conduit [130]. This shell provides mechanical protection against impacts and can be made from or coated with anti-biofouling materials. The figure shows a "CLEARANCE" between the conduit and the shell, maintained by internal "RADIAL SPACER" elements, which preserve alignment and absorb shock.

FIG. 10 is a flowchart illustrating the sequential steps of the method for generating hydrokinetic energy using the gravity-driven system. The method includes the steps of positioning the system underwater, directing water into the intake via gravitational force, generating electricity with the inline turbine, siphoning the water through a discharge path, and regulating the flow with a venturi module.

Illustrative Deployment Applications

In one illustrative embodiment, the modular hydrokinetic energy system is deployed approximately 60 meters below the ocean surface, suspended from a buoyant mooring structure without reliance on the seabed. The intake funnel, with a 10-foot inlet diameter and gradual 28D taper, initiates gravity-driven flow into a modular vertical conduit composed of 20-foot interlocking segments. Flow is sustained through siphonic action and stabilized via an integrated venturi discharge module, eliminating the need for external pumps or ambient current. An inline axial-flow turbine module, housed within the conduit, generates electrical power continuously. The system is capable of autonomous re-priming through a recovery siphon and requires minimal intervention, making it ideal for remote ocean deployment with variable or stagnant current environments.

In another practical deployment scenario, the modular hydrokinetic energy system is installed adjacent to a floating naval platform or oceanic research base, such as those stationed near Navy-controlled islands. The system is suspended from buoyant support modules and stabilized using flexible mooring lines, entirely avoiding pile or foundation anchoring. Its modular architecture allows conduit sections, intake funnels, turbines, and venturi units to be assembled on-site in variable lengths and configurations tailored to the available draft and water column. Once operational, the system delivers continuous power through gravity-driven siphonic flow regulated by an inline venturi discharge. When relocation is necessary, the entire structure can be disassembled and redeployed elsewhere without seabed disturbance or infrastructure footprint, enabling flexible power generation across naval, remote island, or disaster-relief zones.

ENHANCED FIGURE DESCRIPTIONS

This document provides rewritten Brief and Detailed Descriptions for FIGS. 1 through 9, aligned with the enhanced clarity, precision, and completeness of the "Modular Gravity-Driven Hydrokinetic Energy System" patent application draft.

Figure Titles—Kordlou Green Energy System

FIG. 1: System Overview: Kordlou Green Energy Assembly

FIG. 2: Intake Funnel Assembly with Marine Screen and Valve

FIG. 3: Modular Joint Assembly in Vertical Conduit

FIG. 4: Turbine Module with Axial-Flow Turbine and Generator

FIG. 5: Hydraulic Discharge System with Vertical Riser and One-Way Valve

FIG. 6: Venturi Discharge System with Pressure Sensor Array

FIG. 7: Mooring and Buoyancy Control System

FIG. 8: Siphon Recovery System with Auxiliary Venturi and Priming Path

FIG. 9: Protective Shell for Structural Components (Anti-Biofouling/Impact)

FIG. 10: Flowchart for Gravity-Fed Energy Generation Method.

FIG. 1—System Overview: Kordlou Green Energy Assembly

Brief Description of FIG. 1: FIG. 1 provides a schematic overview of the Kordlou Green Energy System [100] in its operational, submerged deployment within a body of water [10], illustrating the principal subsystems and their interconnections, including the intake funnel [110], optional buoyancy modules [240], vertical conduit [130] housing the axial turbine/generator [140], hydraulic discharge system [150] with elbows ([152], [156]), horizontal segment [154], vertical riser [158] with thermal compensation unit [159], one-way valve [160], venturi system [170], Siphon Recovery System [180], and the mooring system [200] with anchors [210], mooring lines [220], and Tension Controllers [230].

Detailed Description of FIG. 1 (for "Detailed Description of the Invention" section): Referring to FIG. 1, the Kordlou Green Energy System [100] is depicted in its fully deployed configuration, suspended within a body of water [10] and anchored to the seabed [10*a*] via a mooring system [200], operating independently of surface structures. Water ingress occurs at the intake funnel [110], strategically positioned at a suggested minimum depth (e.g., 28 times the conduit diameter, 28D) below the water surface to harness hydrostatic head and minimize surface-related disturbances. Optional buoyancy modules [240] are shown near the intake, contributing to depth control and stability. The gravitational flow proceeds downwards through the vertical conduit [130], passing through the axial turbine/generator module [140] where energy conversion occurs. The flow then enters the hydraulic discharge system [150], characterized by elbows ([152], [156]), a horizontal segment [154], and a vertical riser [158]. An integrated thermal compensation unit [159] is shown on the riser [158]. A one-way valve [160] is positioned at the apex of the discharge loop, leading to the venturi system [170], which optimizes discharge pressure and flow characteristics. Final discharge occurs via the Siphon Recovery System [180].

The entire assembly is stabilized by the mooring system [200], comprising seabed anchors [210], tensioned mooring lines [220], and distinct Tension Controllers [230] integrated into the mooring lines. This holistic view underscores the system's integrated design for autonomous, subsurface power generation. The "NOT SCALED" notation indicates the schematic nature of the drawing.

FIG. 2—Intake Funnel Assembly with Marine Screen and Valve

Brief Description of FIG. 2: FIG. 2 presents a detailed cross-sectional schematic of the intake assembly, showcasing the conical intake funnel [110] covered by a dome-shaped wedge wire screen [112]. Internally, an optional Vortex Suppressor [114] is shown (exemplified in an inset as a cylindrical mesh structure). At the funnel's throat, a full-bore isolation valve [120] is depicted, connected via an RTJ (Ring-Type Joint) flange connection [119](exemplified in an inset) to the initial extension pipe [118] of the vertical conduit.

Detailed Description of FIG. 2 (for "Detailed Description of the Invention" section): Referring to FIG. 2, the intake assembly is the initial point of water ingress for the Kordlou Green Energy System [100], meticulously designed for optimal hydraulic performance and robust protection against marine bio-ingress and debris. It is strategically positioned at a substantial subsurface depth, specified as no less than twenty-eight times the nominal internal diameter (D) of the vertical conduit [130]. This depth is critical for maximizing hydrostatic head available for power generation and minimizing deleterious surface influences such as wave action or floating debris.

The primary component is the conical intake funnel [110], oriented with its widest aperture facing upwards to efficiently capture ambient water from the surrounding body of water [10]. The funnel's geometry, with an uppermost aperture designed to be approximately twelve times D and a vertical height of approximately six times D, ensures efficient water capture while maintaining manageable entrance velocities, thus reducing hydraulic losses at entry. This aperture is protectively covered by a marine life-exclusion screen [112], explicitly labeled as a "Dome-shaped wedge wire screen [112]" in FIG. 2. This screen is preferably fabricated from robust, corrosion-resistant wedge wire, formed into a dome shape to provide structural integrity against hydrostatic pressures and potential impacts, prevent the ingress of fish, marine mammals, and large debris, minimize flow restriction, promote laminar flow into the funnel, and offer inherent anti-fouling characteristics due to its smooth profile and material.

Positioned coaxially within the funnel [110], downstream of the screen [112], is an optional Vortex Suppressor [114]. FIG. 2 provides an inset showing an exemplary detailed view of the Vortex Suppressor [114] as a robust cylindrical mesh or screen structure. This component [114], whether in the depicted mesh form or as an assembly of radial vanes and, in certain embodiments, a horizontal baffle plate (not explicitly shown but encompassed by the design), functions critically to mitigate the formation of rotational swirl or vortices in the incoming water. Such vortices can introduce inefficiencies, uneven loading on the downstream turbine, and cavitation. By stabilizing the axial flow profile, the Vortex Suppressor [114] significantly enhances downstream hydraulic efficiency and turbine performance.

At the narrowed throat of the funnel [110], where the converging section transitions to the vertical conduit, a full-bore isolation valve [120](labeled "An integrated flow control valve [120]" in FIG. 2) is mounted. This valve [120], typically a gate or ball valve designed for subsea operation, provides essential control functionality for system start-up, controlled shutdown, and critically, for maintenance isolation of the intake from the rest of the system. The valve [120] is mechanically joined to the downstream extension pipe [118](which forms the uppermost segment of the vertical conduit [130]) via a precision-engineered Ring-Type Joint (RTJ) flange connection [119]. An inset in FIG. 2 shows an exemplary detailed structure of such an RTJ flange connection [119], highlighting its components: the mating flanges with machined grooves, a metallic RTJ gasket (typically oval or octagonal in cross-section) that provides a high-integrity, metal-to-metal seal, and the securing bolts. This type of connection is chosen for its reliability under high pressure and suitability for subsea conditions. Downward arrows in FIG. 2 clearly indicate the intended direction of water flow through the intake assembly. The "Not Scaled" notation applies, emphasizing the schematic representation.

FIG. 3—Modular Joint Assembly in Vertical Conduit

Brief Description of FIG. 3: FIG. 3 illustrates a typical modular joint within the vertical conduit [130], featuring a main schematic view of the joint [136] connecting two conduit sections (e.g., above the turbine module [140] and upper isolation valve [146*a*]). An enlarged, exploded perspective inset details the components of the Bolted Flange Assembly [136], including Weld Neck Flanges [137], RTJ faces [138], an RTJ gasket [139], alignment guide pins [141], alignment sockets [142], fasteners [144], anti-seize compound [145], and chamfered bolt holes [143], facilitating the connection of modular pipe sections [135].

Detailed Description of FIG. 3 (for "Detailed Description of the Invention" section): Referring to FIG. 3, the modular joint architecture employed in the construction of the vertical conduit [130] is depicted with precision. The vertical conduit [130](also shown in FIG. 1) forms the primary gravitational flow path, channeling water from the intake assembly to the turbine module and subsequently to the discharge system. It is constructed from a plurality of modular pipe segments [132](not individually numbered in FIG. 3 but implied by section [135]), each typically having a length of approximately eight times the nominal conduit diameter (D). This modular design is a cornerstone of the invention's practicality, facilitating scalable installation, transportation, and critically, in-situ serviceability and component replacement.

The left portion of FIG. 3 shows a segment of the vertical conduit [130] as it would be situated within the body of water [10], highlighting a Bolted Flange Assembly [136] that constitutes a typical joint between two modular pipe sections. This joint is shown illustratively proximally located above the turbine module [140] and its upper isolation valve [146a], emphasizing its role in the overall system assembly.

The right portion of FIG. 3 provides an enlarged, exploded perspective view, meticulously detailing the constituent components of this Bolted Flange Assembly [136]. Each modular pipe section (referred to as [135] in the context of the exploded component view label in FIG. 3, representing the prepared ends of segments [132]) terminates in a permanently affixed Weld Neck Flange (WNF) [137]. Weld Neck Flanges are chosen for their structural integrity and ability to transfer stresses to the pipe, reducing high stress concentrations at the base of the flange. The mating surfaces of these flanges [137] are precision-machined to form Ring Type Joint (RTJ) faces [138]. These faces feature specifically profiled grooves designed to accommodate a metallic RTJ gasket [139](schematically depicted in the inset, typically octagonal or oval in cross-section). This configuration ensures a robust, high-pressure, metal-to-metal seal, exceptionally suited for deep-water hydrostatic environments and capable of withstanding significant operational loads.

Assembly alignment, crucial for achieving a proper seal especially in challenging underwater or barge-based installation scenarios, is ensured by integrated alignment guide pins [141] on one flange engaging with corresponding alignment sockets [142] machined into the opposing flange.

The flanges are securely fastened by multiple high-strength fasteners [144](e.g., stud bolts and nuts), which pass through circumferentially arranged chamfered bolt holes [143]. The chamfering facilitates bolt insertion and reduces stress concentrations. Prior to installation, all threaded components (fasteners [144] and corresponding threads) are treated with a marine-compatible anti-seize compound [145] to prevent galling (cold welding) of the threads, facilitate correct torque application for uniform gasket compression, and ensure long-term serviceability by allowing for easier disassembly during maintenance cycles. This robust and reliable bolted flange design supports efficient field assembly and modular replacement of conduit sections or entire modules (like the turbine module) without requiring specialized underwater welding or complex press-fit equipment, thereby significantly contributing to the system's operational uptime and reducing maintenance costs. The "Not Scaled" notation applies.

FIG. 4—Turbine Module with Axial-Flow Turbine and Generator

Brief Description of FIG. 4: FIG. 4 provides a multi-perspective schematic illustration of the Turbine Module [140]. The main view shows its integration within the vertical conduit [130], bounded by upper [146a] and lower [146b] isolation valves connected via flange assemblies [136]. A detailed cutaway inset, labeled "Turbine/Generator Shell," reveals the inline axial-flow turbine [147] and electrical generator [148]. Another schematic inset ("Schematic of Turbine-Generator Assembly") further details the turbine-generator assembly and subsea cable [188]. An inset on the left provides a detailed schematic of the generator [188] (contextually), its sealed, pressure-compensated enclosure, and a sealed cable penetrator for the subsea cable.

Detailed Description of FIG. 4 (for "Detailed Description of the Invention" section): Referring to FIG. 4, the Turbine Module [140] is depicted as the heart of the Kordlou Green Energy System [100], serving as the primary energy conversion unit. It is strategically housed as an inline component within the vertical conduit [130], designed for optimal hydraulic efficiency and exceptional serviceability.

The central panel of FIG. 4 illustrates a segment of the vertical conduit [130] submerged in the body of water [10], with the Turbine Module [140] securely positioned between an upstream (upper) full-bore isolation valve [146a] and a downstream (lower) full-bore isolation valve [146b]. These isolation valves ([146a], [146b]), likely gate or ball valves suitable for subsea operation, are connected to the turbine module and the adjacent conduit sections via Bolted Flange Assemblies [136](as meticulously detailed in FIG. 3). The inclusion of these isolation valves is a critical inventive feature, as they allow the Turbine Module [140] to be hydraulically isolated from the rest of the water column within the conduit [130]. This isolation capability is paramount for enabling in-situ maintenance, detailed inspection, or complete replacement of the turbine [147] or generator [148] components, or the entire module [140], without the need to dewater, depressurize, or recover the extensive and cumbersome vertical conduit [130]. This dramatically reduces operational downtime, maintenance complexity, and associated costs, representing a significant advantage over less modular designs.

An enlarged cutaway inset in FIG. 4, labeled "Turbine/Generator Shell," provides a clear view of the internal arrangement within the Turbine Module [140]. Illustrative arrows indicate the downward direction of water flow, which impinges upon the blades of an axial-flow turbine [147]. This turbine [147] is preferably of a Kaplan type or a similar high-efficiency, variable-pitch or fixed-pitch blade configuration, optimized for the specific head and flow conditions of the deployment site. The turbine [147] is mechanically coupled, potentially via a pressure-compensated shaft assembly (not explicitly detailed but implied), to an electrical generator [148], which converts the rotational mechanical energy into electrical power.

Although a Kaplan-type axial turbine may be particularly well-suited for lower head installations (e.g., <100 feet of hydrostatic head), the invention is not limited to any single specific turbine geometry. It is anticipated and within the scope of this disclosure that turbine manufacturers will customize various parameters—such as rotor diameter, blade profile, number of blades, blade pitch control mechanisms (if any), operational RPM, and the integration specifics of the generator [148]—for each unique deployment scenario to maximize energy capture efficiency.

A crucial aspect detailed in an inset on the left of FIG. 4 is the generator assembly [188](using [188] here to refer to the generator [148] and its housing contextually). This inset shows the "SEALED, PRESSURE-COMPENSATED ENCLOSURE" for the generator. This enclosure is typically filled with a dielectric fluid (e.g., oil) to ensure electrical insulation, facilitate heat dissipation, and critically, to equalize the internal pressure with the external ambient subsea hydrostatic pressure. This pressure compensation prevents the housing from being crushed at depth and protects the seals. The inset also clearly illustrates a "SEALED CABLE PENETRATOR" for the "SUBSEA CABLE." This penetrator gland is a high-integrity, subsea-rated component designed to allow the electrical power cable [188](which may also carry data/signal lines) to exit the sealed generator housing without compromising its water tightness or pressure integrity. It typically employs robust sealing mechanisms (e.g., molded elastomers, O-rings, compression ferrules) and a strain-relief boot.

A further schematic inset in FIG. 4, titled "Schematic of Turbine-Generator Assembly," visually clarifies the coaxial arrangement of the axial-flow turbine [147] and the directly coupled electrical generator [148]. This inset also shows the subsea electrical cable [188] responsible for transmitting the generated power to a subsea junction box or directly to shore/platform. This cable [188] may be embedded with fiber optic channels for data transmission and control, and it routes externally from the turbine module, typically along or within the conduit structure, protected from the marine environment. The "Not Scaled" notation applies to all parts of FIG. 4.

FIG. 5—Hydraulic Discharge System with Vertical Riser and One-Way Valve

Brief Description of FIG. 5: FIG. 5 is a schematic view illustrating the Hydraulic Discharge System [150]. It shows the post-turbine flow path originating from below the turbine module [140](specifically downstream of isolation valve [146b]), proceeding through a first elbow [152], a horizontal conduit segment [154], a second elbow [156], and a vertical riser [158]. The riser [158] incorporates an optional thermal compensation unit [159], detailed in an inset as a bellows-type expansion joint. A one-way valve [160] is shown at the apex of the riser, upstream of the venturi system [170], with final discharge occurring via the Siphon Recovery System [180]. The drawing indicates a maximum riser height (e.g., 10m) and the overall system within the body of water [10].

Detailed Description of FIG. 5 (for "Detailed Description of the Invention" section): FIG. 5 provides a comprehensive schematic illustration of the Hydraulic Discharge System [150]. This system is an ingeniously engineered conduit pathway designed to manage the post-turbine outflow, redirect the flow strategically upward, and optimize overall hydraulic performance for the Kordlou Green Energy System [100]. The effective functioning of this subsystem is critical in enabling and sustaining a gravity-fed discharge loop, maintaining siphon continuity, and integrating seamlessly with the downstream venturi and siphon recovery components.

The Hydraulic Discharge System [150] commences immediately downstream of the lower isolation valve [146b] of the turbine module [140]. Water exiting the turbine module, having imparted a significant portion of its energy, flows through a first smooth, large-radius elbow [152]. This elbow [152] is meticulously designed to transition the flow direction from vertical (downward) to horizontal with minimal hydraulic losses (e.g., due to friction or flow separation), thereby promoting stable momentum transfer.

This first elbow [152] leads into a horizontal conduit segment [154]. The primary purpose of this segment is to stabilize the redirected flow profile before it is again turned upwards. Optionally, this horizontal segment [154] may be fitted with internal flow straighteners or vortex-breaking vanes (not explicitly shown) to reduce any residual swirl imparted by the turbine, further enhancing hydraulic efficiency.

Following the horizontal segment [154], a second smooth, large-radius elbow [156] redirects the now stabilized horizontal flow vertically upward into the vertical riser segment [158]. Similar to the first elbow [152], this second elbow [156] is designed for high hydraulic efficiency, ensuring that the flow enters the riser [158] with minimal energy loss and avoiding conditions that could lead to cavitation or flow separation.

The vertical riser segment [158] is of a carefully constrained height, indicated illustratively as "Max. 10 m" in FIG. 5. This maximum height is a critical design parameter, engineered to effectively manage the discharge elevation relative to the intake, balance internal system pressures with the external hydrostatic environment, and is crucial for establishing and sustaining the siphon action that aids in drawing water through the system, thereby maintaining robust flow continuity.

Integrated within this riser [158] is an optional, yet highly practical, thermal compensation unit [159]. An exemplary bellows-type structure for this unit [159] is detailed in an inset in FIG. 5, showing its connection between sections of the riser segment [158](the label "DVISHARGUE PIPE" in the inset appears to be a typographical error for "DISCHARGE PIPE"). This unit [159], which could also be a slip joint or a section of flexible conduit, is designed to accommodate dimensional changes in the conduit system due to thermal expansion or contraction caused by variations in seawater temperature or material properties. It allows for dynamic length adjustment and provides crucial strain relief, preventing stress buildup in the rigid conduit sections and flanged connections.

At or near the apex of the riser [158], and critically positioned upstream of the Venturi System [170], a one-way check valve [160] is installed, as clearly depicted in FIG. 5. This valve (e.g., a swing check or nozzle check valve) is vital for ensuring unidirectional flow out of the system. It plays a crucial role in preventing back-siphoning or reverse pressure surges (e.g., during shutdown or flow interruptions), thereby maintaining the integrity of the siphon loop and protecting upstream components. Flow proceeds from the one-way valve [160] directly into the Venturi System [170], and subsequently discharges via the Siphon Recovery System [180]. The "Not Scaled" notation applies, and Bolted Flange Assemblies [136] are shown connecting various segments, underscoring the modularity of the discharge system.

FIG. 6—Venturi Discharge System with Pressure Sensor Array

Brief Description of FIG. 6: FIG. 6 is a detailed schematic longitudinal section of the Venturi System [170]. It illustrates its connection from the upstream one-way valve [160](flow entering from right, implied from [160/170] label) and its sequential geometric segments: an optional Inlet Section (Li), a Converging Section (Lc) with angle α, a Throat Section (Lt), a Diverging Section (Ld) with angle β, and an optional Recovery Section (Lr). An embedded pressure sensor array [172] is shown. The terminal flare of the Recovery Section [Lr] is depicted leading towards the Siphon Recovery System [180], indicating the fluidic interface.

Detailed Description of FIG. 6 (for "Detailed Description of the Invention" section): FIG. 6 provides a detailed schematic longitudinal section of the Venturi System [170], a pivotal component of the Hydraulic Discharge System [150]. This system is meticulously engineered to enhance discharge velocity, promote pressure recovery downstream of the turbine, and stabilize the overall flow dynamics, contributing significantly to the efficiency and reliability of the Kordlou Green Energy System [100]. The venturi receives flow directly from the upstream one-way check valve [160](the connection is shown in FIG. 6 via a typical flanged joint [136], with flow entering from the right, implied from [160]).

The Venturi System [170] comprises a series of precisely contoured and interconnected geometric segments, each designed to perform a specific fluid dynamic function:

1. Optional Inlet Section (Li): An initial straight section (Li) may be included to condition the incoming flow from the one-way valve [160], ensuring a uniform velocity profile and eliminating any residual disturbances before the flow enters the converging section.
2. Converging Section (Lc): This section tapers smoothly inward at a defined angle α (alpha). As the cross-sectional area decreases, the fluid velocity increases proportionally (due to the principle of continuity), thereby converting some of the fluid's pressure head into kinetic energy. The angle α is optimized (typically suggested as 15-30°) to achieve this acceleration with minimal turbulence and boundary layer separation.
3. Throat Section (Lt): This is the segment with the minimum cross-sectional area. Here, the flow velocity reaches its maximum, and consequently, the static pressure drops to its minimum value within the venturi, in accordance with Bernoulli's principle. This low-pressure zone is critical for the venturi's function in enhancing discharge and can be leveraged by the Siphon Recovery System [180].
4. Diverging Section (Ld): Following the throat, this section gradually expands outward at a defined angle β (beta). The purpose of this diffuser section is to decelerate the fluid in a controlled manner, converting kinetic energy back into pressure head (pressure recovery). The angle β is typically smaller than α (e.g., 5-15°) and is carefully optimized to maintain boundary layer adherence to the walls and prevent flow detachment (stalling), which would lead to significant energy losses and instability.
5. Optional Recovery Section (Lr): A final straight section (Lr) may be added after the diverging section to allow for further flow stabilization and pressure equalization before the fluid exits the Venturi System [170] and interfaces with the Siphon Recovery System [180] or the ambient environment.

The total axial length of the venturi is represented as Lv, where Lv=Li+Lc+Lt+Ld+Lr.

An embedded pressure sensor array [172] is strategically shown integrated within the venturi walls, with sensors positioned across key pressure zones (e.g., before the converging section, at the throat, and within or after the diverging section). This array allows for real-time monitoring of differential pressure values across the venturi. This data is invaluable for dynamic performance evaluation, for diagnosing flow conditions (e.g., confirming siphon action), and potentially for adaptive control of other system parameters (e.g., turbine operation or siphon recovery activation).

Arrows within FIG. 6 denote the direction of flow and schematically illustrate the transformation of flow characteristics (e.g., acceleration in the converging section, deceleration in the diverging section). The specification clarifies that the optimized taper angles (a and p) and the lengths of the various segments (Li, Lc, Lt, Ld, Lr) are selected based on established fluid dynamics principles, empirical data, and computational fluid dynamics (CFD) modeling, tailored to site-specific deployment conditions such as the nominal conduit diameter (D) and expected discharge velocities. These geometric parameters may be fixed, manually selectable (e.g., through interchangeable nozzle inserts), or, in advanced embodiments, dynamically adjustable via mechanical inserts, modular nozzles, or even actuator-based morphing geometries. Such adjustability, if implemented, could be controlled by the system's control modules, utilizing real-time data from the pressure sensor array [172] for continuous optimization of discharge efficiency.

The pressure recovery and flow stabilization achieved by the Venturi System [170] synergistically enhance the stability and effectiveness of the downstream siphon effect, contributing to a more consistent, efficient, and self-regulating overall discharge process. The venturi module operates passively, utilizing the gravitational head and pressure differentials established upstream by the system's configuration to maintain discharge momentum and minimize overall head loss, without requiring active pumping. The terminal flare of the Recovery Section [Lr] in FIG. 6 is schematically illustrated as the fluidic interface leading towards the Siphon Recovery System [180], which is further detailed in FIG. 8. The "Not Scaled" notation applies.

FIG. 7—Mooring and Buoyancy Control System

Brief Description of FIG. 7: FIG. 7 is a schematic representation of the Mooring and Buoyancy Control System [200] supporting the Kordlou Green Energy System [100]. It depicts the main structure (conduit [130], turbine module [140]) suspended in the body of water [10]. The system shows Seabed Anchors [210](with an inset detailing an exemplary "Anchor Bolt" type), Tensioned Mooring Lines [220], strategically placed Tension Controllers [230] (with an inset detailing an exemplary "Tension Controller Mooring line" assembly), and Optional Buoyancy Adjustment Modules [240] shown near the top of the conduit [130].

Detailed Description of FIG. 7 (for "Detailed Description of the Invention" section): FIG. 7 provides a schematic representation of the sophisticated Mooring and Buoyancy Control System [200]. This system is fundamental to the invention's unique capability for stable, mid-water column deployment of the Kordlou Green Energy System [100], rendering it independent of fixed, costly, and ecologically disruptive seabed foundations. The main operational structure, including a segment of the vertical conduit [130] and the turbine module [140](with the upper isolation valve [146a] visible), is shown effectively suspended within the body of water [10], clear of the seabed [10a].

The Mooring and Buoyancy Control System [200] comprises several key integrated components:

1. Seabed Anchors [210]: The system is secured to the ocean floor [10a] by one or more seabed anchors [210]. These anchors must provide sufficient holding power to counteract all operational and environmental loads. The type of anchor employed can be varied to suit specific seabed conditions and may include, but is not limited to gravity-based anchors, drag embedment anchors, suction pile anchors, or specialized anchor bolts, as detailed in the exemplary inset on the right of FIG. 7, labeled "[210] Anchor Bolt." This inset provides a detailed view of such an anchor, potentially a grouted or mechanically expanding rock bolt, suitable for hard seabeds, complete with a key illustrating its components (e.g., anchorage points, tensioning element, grout body).
2. Tensioned Mooring Lines [220]: High-strength, corrosion-resistant tensioned mooring lines [220] connect the seabed anchors [210] to engineered structural attachment points on the main body of the Kordlou Green Energy System [100]. These lines are fabricated from materials such as aramid fiber composites, heavy-duty chain, or specialized steel wire rope, and are typically deployed in a spread mooring configuration to maintain precise vertical axial alignment and resist lateral and torsional loads.
3. Tension Controllers [230]: Strategically placed along the mooring lines [220], or integrated at their attachment points, are Tension Controllers [230]. An exemplary embodiment is shown as an inset on the left of FIG. 7 ("Tension Controller Mooring line" assembly). These controllers, distinct from anchors, can be mechanical (e.g., spring-damper units), hydraulic systems, or electronically monitored actuators, configured to absorb shock loads, adjust or maintain optimal pre-tension, enhance stability, and improve the fatigue life of the mooring infrastructure.
4. Optional Buoyancy Adjustment Modules [240]: Affixed typically near the upper portion of the vertical conduit [130], these modules provide adjustable buoyancy for precise depth control, vertical alignment, assistance during installation/maintenance, and potential emergency flotation, utilizing mechanisms such as variable ballast chambers, air bladders, or closed-cell foam.

The "Not Scaled" notation applies. The synergistic operation of these components ensures the Kordlou Green Energy System [100] remains securely positioned and stable at its designated operational depth.

FIG. 8—Siphon Recovery System with Auxiliary Venturi and Priming Path

Brief Description of FIG. 8: FIG. 8 is a schematic illustration of the Siphon Recovery System [180], positioned downstream of the Venturi System [170](flow shown entering from [170]). Key functional components depicted include an Auxiliary Venturi Path [182], a Priming Conduit [184], and an interface to a Monitoring Station for receiving an "emergency override trigger" signal to activate recovery components.

Detailed Description of FIG. 8 (for "Detailed Description of the Invention" section): FIG. 8 details the Siphon Recovery System [180], a critical component designed to ensure the operational robustness of the Kordlou Green Energy System [100] by maintaining or re-establishing continuous hydraulic flow (the siphon effect) within the discharge leg. It is fluidly connected immediately downstream of the primary Venturi System [170](flow entering from [170] at top left), significantly enhancing system reliability by mitigating flow interruptions.

The configuration includes several key functional components:
1. Auxiliary Venturi Path [182]: A secondary, smaller-scale venturi channel, shown schematically branching off and rejoining the main discharge path or in a parallel/bypass orientation. Engineered to create localized low-pressure zones (acting as an eductor/ejector), it assists in siphon reactivation or debris clearance through controlled suction effects, particularly during restarts or blockage events.
2. Priming Conduit [184]: A dedicated conduit for introducing a priming fluid volume (typically water) into the discharge leg to displace entrained air or vapor pockets, restoring full liquid continuity. Fluid sources can include an onboard sealed ballast tank, an isolated compartment in a buoyancy module [240], a hydrostatic gradient-fed line, an external pressurized source, or by leveraging system-internal pressure differentials (e.g., connecting the main venturi throat [Lt] to the riser [158] for passive re-priming).
3. Emergency Override Interface (via Monitoring Station): Includes a control interface to a "MONITORING STATION" capable of receiving a "Signal input (emergency override trigger)". This signal (transmitted via hardwired line, fiber optic, or wireless acoustic means) can activate recovery components, such as an electromechanical valve governing fluid injection from the priming conduit [184] or controlling flow through the auxiliary venturi path [182].

Solid arrows illustrate primary fluid pathways; dashed arrows indicate induced/controlled secondary flows. The Siphon Recovery System [180] may be a modular unit or integrated into the discharge structure, working synergistically with the Venturi System [170] for robust, fault-tolerant operation.

FIG. 9—Protective Shell for Structural Components (Anti-Biofouling/Impact)

Brief Description of FIG. 9: FIG. 9 is a schematic cross-sectional view illustrating a primary structural component, the Vertical Conduit [130], encased within an optional impact-resistant and anti-biofouling Protective Shell [190]. The figure specifically exemplifies a clearance-based interface (labeled "CLEARANCE", typo "EARANC" in drawing) between the shell and the conduit, maintained by internal Radial Spacers.

Detailed Description of FIG. 9 (for "Detailed Description of the Invention" section): FIG. 9 provides a detailed cross-sectional view of an exemplary embodiment of structural protection, where the Vertical Conduit [130] is encased by an optional Protective Shell [190]. This feature underscores the invention's design for durability and long-term operation in harsh marine environments by providing mechanical protection against impacts, inhibiting biofouling, and offering general environmental shielding.

All primary structural elements are constructed from marine-grade corrosion-resistant materials (e.g., stainless-steel alloys, polymer composites, titanium alloys). Internal surfaces of the conduit [130] may have specialized coatings/linings to minimize hydraulic friction and enhance corrosion/abrasion resistance.

The Protective Shell [190], as illustrated, can be mounted with a defined clearance interface relative to the Vertical Conduit [130], maintained by internal "RADIAL SPACER" elements. These spacers (e.g., compliant dampening rings, segmented bushings) preserve concentric alignment, isolate vibration, absorb impact shock, and allow for differential thermal expansion. They can be continuous or segmented, compression-fit, mechanically retained, or housed in grooves.

Alternatively, the Protective Shell [190] may be directly bonded to the conduit [130](via adhesives, composite over-wraps, or lamination), creating a monolithic, composite, pressure-resistant assembly.

In either configuration, the Protective Shell [190] significantly contributes to the system's robustness by mitigating impact loading, resisting biofouling, and reducing mechanical abrasion, thereby extending the operational lifespan and reliability. The "Not Scaled" notation applies.

FIG. 10—Flowchart for Gravity-Fed Energy Generation Method.

Brief Description of FIG. 10

FIG. 10 is a flowchart illustrating an example method of operating the modular gravity-driven hydrokinetic energy system, including steps such as submerged positioning, gravity-based water intake, inline turbine energy conversion, siphon-sustained flow, venturi-regulated discharge, and seabed-independent anchoring.

Detailed Description of FIG. 10

FIG. 10 illustrates a representative method of generating electrical energy from hydrokinetic flow using the modular gravity-driven system described herein. The process begins with the submerged positioning of the intake funnel [110], suspended beneath the ocean surface via mooring cables [180] and optionally supported by a buoyant frame or tensioned platform. Water is drawn downward through the intake by gravitational force into a modular vertical conduit [130] comprising interlocking segments.

Within the conduit, the axial-flow turbine module [140] harnesses the kinetic energy of the downward-moving water, rotating a generator [148] to produce electricity. Downstream of the turbine, a siphon-based discharge path sustains continuous flow, further regulated by an integrated venturi module [170] that controls exit pressure and minimizes head loss. The system includes an optional self-priming mechanism that restores flow after interruption without external pumping.

The entire process operates without dependency on ambient ocean currents or seabed anchoring, enabling mobile deployment, island-based use, or application in disaster relief scenarios

The invention claimed is:

1. A modular gravity-driven hydrokinetic power system comprising:
   a submerged intake funnel [110] configured for gravitational water collection;
   a vertical conduit [130] fluidly connected to said funnel [110];
   an inline turbine-generator module [140] disposed within said conduit [130], said module [140] comprising an axial-flow turbine [147] and an electrical generator [148] operatively coupled thereto, said turbine-generator module [140] configured to convert hydraulic flow into electrical energy, with the generator [148] enclosed in a sealed housing;
   a discharge system [150] comprising a one-way valve [160], a vertical riser [158], and a venturi module [170];
   a tensioned mooring system [200] configured for seabed-independent positioning of the hydrokinetic power system; and
   a siphon recovery subsystem [180], wherein the system operates independently of ocean currents to generate electrical power.

2. The system of claim 1, wherein the intake funnel [110] includes a dome-shaped marine life screen [112] and an integrated vortex suppressor [114] configured to disrupt rotational eddy formation in axial flow.

3. The system of claim 1, wherein said turbine-generator module [140] is bounded by full-bore isolation valves [146A], [146B] to permit in-situ servicing and replacement.

4. The system of claim 1, wherein said generator [148] is sealed within a waterproof, pressure-compensated housing.

5. The system of claim 1, further comprising a protective shell [190] surrounding at least a portion of the vertical conduit [130], said shell [190] being configured to resist mechanical impact and inhibit marine biofouling.

6. The system of claim 1, wherein said turbine-generator module [140] is electrically coupled to a subsea transmission line [188].

7. The system of claim 1, wherein the discharge riser [158] is constrained to a maximum vertical height of 10 meters to sustain siphon pressure.

8. The system of claim 1, wherein said intake funnel [110] is positioned at a vertical offset of at least 28 conduit diameters below an ocean surface.

9. The system of claim 1, further comprising a monitoring subsystem including sensors configured to measure parameters selected from the group consisting of flow rate, pressure, system tilt, component vibration, and ambient temperature.

10. The system of claim 1, wherein all internal surfaces of the system in contact with seawater are fabricated from corrosion-resistant materials.

11. The system of claim 1, wherein replacement of said turbine-generator module [140] can occur without full system retrieval using modular flange disassembly.

12. The system of claim 1, wherein said inline turbine [147] is of an axial-flow geometry.

13. The system of claim 12, wherein said turbine [147] is configured to be optimized for site-specific head, flow velocity, and conduit diameter.

14. The system of claim 1, wherein the siphon recovery subsystem [180] comprises an auxiliary venturi [182] and a priming conduit [184] to restore hydraulic continuity.

15. The system of claim 14, wherein said priming conduit [184] fluidly connects a low-pressure region of the venturi module [170] to the vertical riser [158], enabling passive re-priming.

16. The system of claim 1, wherein the vertical conduit [130] comprises modular pipe segments [132] joined by flanged connections [136].

17. The system of claim 16, wherein said modular pipe segments [132] and said turbine-generator module [140] include external flange couplings and are configured with internal alignment features selected from the group consisting of guide pins [141], corresponding sockets [142], and alignment sleeves, to enable precision reassembly during offshore maintenance operations.

18. The system of claim 16, wherein said vertical conduit [130] further comprises internal coatings or linings selected to minimize hydraulic friction and resist marine corrosion.

19. The system of claim 1, wherein said discharge system [150] includes a thermal expansion joint [159] and said venturi module [170] is configured to recover pressure and promote continuous flow.

20. The system of claim 19, wherein the venturi module [170] includes a converging inlet, a throat, and a diverging outlet and incorporates a sensor array [172] for real-time pressure monitoring.

21. The system of claim 19, wherein a converging inlet of the venturi module [170] is configured with a taper angle between 15 and 30 degrees, and a diverging outlet is configured with a taper angle between 5 and 15 degrees.

22. The system of claim 1, wherein said tensioned mooring system [200] comprises a plurality of pre-tensioned mooring lines [220] anchored to a seabed and optionally coupled to buoyancy adjustment modules [240] for midwater suspension.

23. The system of claim 22, wherein said mooring system [200] further comprises a plurality of neutrally buoyant elements distributed along said tensioned mooring lines [220], configured to assist in maintaining vertical orientation of the system.

24. The system of claim 22, wherein said tensioned mooring lines [220] are fabricated from materials selected from the group consisting of aramid fiber composites, chain, and steel cable.

25. The system of claim 22, wherein said mooring system [200] further comprises said optional buoyancy adjustment modules [240] utilizing mechanisms selected from the group consisting of variable ballast tanks, inflatable bladders, and high-buoyancy foam inserts.

26. A method for generating hydrokinetic energy, the method comprising:
   positioning a modular conduit system in a body of water, the system having an intake funnel, a vertical conduit, and an inline turbine-generator;
   directing water into the intake funnel under gravitational force;
   channeling the water downward through the vertical conduit to rotate the turbine-generator and produce electrical energy;
   discharging the water through a siphon-assisted pathway regulated by a venturi module and a one-way valve; and
   stabilizing the system using a seabed-independent mooring system.

27. The method of claim 26, further comprising monitoring a pressure differential across the venturi module to adjust operational parameters.

28. The method of claim 26, further comprising assembling the conduit from modular pipe segments coupled via flange connections.

29. The method of claim 26, further comprising disrupting rotational eddy formation at the intake using a vortex suppressor.

30. The method of claim 26, further comprising sealing the generator in a waterproof, pressure-compensated housing connected to a subsea power transmission line.

31. The method of claim 26, further comprising deploying the system by submerging the intake funnel to a selected depth and anchoring mooring lines to subsea anchors.

32. The method of claim 26, wherein the venturi module includes a converging section with a taper angle between 15 and 30 degrees and a diverging section with a taper angle between 5 and 15 degrees.

* * * * *